United States Patent [19]
Gloger

[11] Patent Number: 5,979,248
[45] Date of Patent: Nov. 9, 1999

[54] METHOD AND DEVICE FOR DETERMINING A POWER

[75] Inventor: Meinrad Gloger, Mülheim/Ruhr, Germany

[73] Assignee: Siemens Aktiengesellschaft, Munich, Germany

[21] Appl. No.: 08/883,152

[22] Filed: Jun. 27, 1997

Related U.S. Application Data

[63] Continuation of application No. PCT/EP95/04959, Dec. 14, 1995.

[30] Foreign Application Priority Data

Dec. 27, 1994 [EP] European Pat. Off. ............ 94 120 664

[51] Int. Cl.$^6$ ....................................................... G01L 5/24
[52] U.S. Cl. ......................................................... 73/862.28
[58] Field of Search ........................ 73/862.191, 862.28, 73/862.29

[56] References Cited

U.S. PATENT DOCUMENTS

| | | | |
|---|---|---|---|
| 5,440,938 | 8/1995 | Leon et al. | 73/862.191 |
| 5,452,616 | 9/1995 | Leon et al. | 73/862.08 |

FOREIGN PATENT DOCUMENTS

| | | |
|---|---|---|
| 0 115 291 A1 | 8/1984 | European Pat. Off. . |
| 0 412 780 A2 | 2/1991 | European Pat. Off. . |
| 0 609 726 A2 | 8/1994 | European Pat. Off. . |
| 2 262 345 | 6/1993 | United Kingdom . |

OTHER PUBLICATIONS

Japanese Patent Abstract No. JP 2028572 (Shigeru), dated Jan. 30, 1990.
Japanese Patent Abstract No. JP 61205830 (Yasuo), dated Sep. 12, 1986.

*Primary Examiner*—Richard Chilcot
*Assistant Examiner*—Jewel V. Thompson
*Attorney, Agent, or Firm*—Herbert L. Lerner; Laurence A. Greenberg

[57] ABSTRACT

A power in a mechanical energy transfer between one of several stationary machines and a shaft assembly is determined. The shaft assembly traverses the machine along a given axis and it rotates about the axis with an angular velocity. The torsion angle by which the shaft assembly is twisted in the machine is measured, and the power in the energy transfer is determined from the product of the torsion angle with a predetermined calibration coefficient. Measuring devices are positioned at the shaft assembly on both sides of the machine which measure the torsion angle. A computer receives the measurement signals from the measuring devices and determines therefrom the power. The system is particularly important in a monitoring system for a machine set with a plurality of machines along a shaft assembly, such as in turbo sets.

19 Claims, 3 Drawing Sheets

METHOD AND DEVICE FOR DETERMINING A POWER

CROSS-REFERENCE TO RELATED APPLICATION

This application is a continuation of copending international application PCT/EP 95/04959, filed Dec. 14, 1995, which designated the United States.

BACKGROUND OF THE INVENTION

1. Field of the Invention

The invention pertains to a method for determining a power by means of which mechanical energy is exchanged between a stationary machine and a shaft assembly which traverses the machine along a given axis and which rotates about the axis with a given angular velocity, and whereby the energy in the shaft assembly flows along the axis.

The invention further pertains to the determination of a power which is output by a machine onto a shaft assembly, and to the determination of a power which a machine absorbs from a shaft assembly.

2. Description of the Related Art

Several kinds of methods and devices for determining a power with which mechanical energy is exchanged between a stationary machine and a rotating shaft assembly have become known in the pertinent art. In particular, there has become known a device in which the determination of the power is derived from a torque which becomes active in a test specimen introduced into the shaft assembly and which causes torsion in the latter. The test specimen may, for example, be an appropriately tapered piece of the shaft assembly which is provided with suitable sensors.

With regard to specific prior art publications, reference may be had to U.S. Pat. Nos. 5,440,938 and 5,452,616 (corresp. EP 0 609 726 A2), GB 2 262 345 A, U.S. Pat. No. 5,215,145 (corresp. EP 0 412 780 A2), and to an extract from "Patent Abstracts of Japan", Volume 11, No. 35 (P542) [2482]. Each of these documents relates to a measurement method and a measuring device for determining a power with which mechanical energy flows through a rotating shaft. The device respectively comprises a plurality of shaft marks provided on the shaft, a plurality of stationary sensors each assigned to a shaft mark, and means for evaluating signals which are output by the sensors and from which the power is calculated. In each case, the shaft between the shaft marks is configured simply and without structure, that is to say it is a slight spacing from one another. This configuration permits the torsion of the shaft occurring for the given power to be predicted theoretically and renders it possible for the power to be measured directly and in absolute terms using such predictions. While these systems provide certain advantages, the devices are deprived of flexibility with regard to further developments. Also, every known device and every known method must manage with a comparatively slight torsion of the rotating shaft, which may lead to substantial impairment of the accuracy of the measurement.

This invention is particularly directed to monitoring a machine set consisting of a plurality of machines, with the machines of the machine set being arranged successively along a common, rotating shaft assembly. For example, the inventor gave particular consideration to a single-shaft turbo set comprising, as a rule, a plurality of steam turbines, in some instances a gas turbine, and a generator. With regard to this application, reference may be had once again to U.S. Pat. Nos. 5,440,938 and 5,452,616 (EP 0 609 726 A2). It is often most important in such an environment to ensure carefully tune and balance the supply and extraction of mechanical energy to the individual machines, in order to load the machines evenly and to avoid overloading. Overloading can consist in this case both in an excessive load and in unplanned idling; the last criterion applies, in particular, to a steam turbine which given inadequate application of steam operates no longer as a turbine but as a compressor and can thereby be exposed to extreme temperature loads.

SUMMARY OF THE INVENTION

It is accordingly an object of the invention to provide a method and a device for determining a power, which overcomes the above-mentioned disadvantages of the heretofore-known devices and methods of this general type and which allows accurate and dependable determination of the power by means of which mechanical energy is exchanged between a stationary machine and a shaft assembly through the machine; it is paramount that the method and the device are distinguished by simplicity and operational reliability and, in an appropriate embodiment, are suitable for monitoring a large machine set.

With the foregoing and other objects in view there is provided, in accordance with the invention, a method for determining a power in a mechanical energy transfer between a first machine of at least two stationary machines and a shaft assembly traversing the at least two machines along a given axis and rotating about the given axis, whereby the energy flows in the shaft assembly along the given axis. The method comprises the steps of measuring a torsion angle by which the shaft assembly is twisted in the first machine, and determining a power transferred between the shaft assembly and the machine from a product of the angle with a predetermined calibration coefficient.

An important advantage of the invention becomes immediately evident, namely the fact that the use of known power measuring devices is dispensed with and recourse is had to components of the machine or of the machine set which are present in any case and are not necessarily to be modified for the specified aim. According to the invention, there is therefore a direct determination of the torsion of the shaft assembly which results from the loading of the shaft assembly produced by the transfer of the mechanical energy in the interior of the machine. The invention advantageously utilizes the fact that the comparatively slight tendency of a conventional shaft assembly to twist is more than balanced by the required length of the shaft assembly needed to traverse the machine.

One condition for the power measurement described herein is that the mechanical energy whose transfer is to be measured flows along a specific direction through the shaft assembly and is not, for example, divided into component flows which flow out in mutually opposite directions. When this is the case, however, then according to the invention only the difference between the component flows can be measured, which certainly is also of some importance for the operation of the machine and can, if necessary, be supplemented by additional measurements which permit a statement on the energy exchanged overall. The main field of application of the invention is, however, a machine either to which energy flows along a defined direction or from which energy flows off in a defined direction. Such is always the case in a turbo set having a plurality of turbines and a generator which are all seated on a single shaft assembly. All of the turbines introduce mechanical energy into the shaft assembly and only the generator absorbs energy from the shaft assembly. A unique direction in which the energy flows is therefore given. In a machine in which this is not the case, the possibility does, of course, always remain of setting up an energy balance which can be used for each machine in order to make a valid statement with regard to the power transferred between it and the shaft assembly.

For a machine which is located at the end of a shaft assembly with the result that an end of the shaft assembly projecting from this machine is thus definitively idling, it can also be determined by applying the invention for a given sense of rotation whether the machine is absorbing power from the shaft assembly or outputting power to the latter. It is necessary for this purpose to determine the orientation of the pseudo-scalar given by the torsion of the shaft assembly, and to set it in relation to the orientation of the pseudo-vector which is given by the sense of rotation of the shaft assembly. A direction is to be determined from this, specifically that direction which supplements the orientation of the pseudo-vector to the present pseudo-scalar. This direction is consequently parallel in any case to the axis about which the shaft assembly rotates. If the direction points to the idling end of the shaft assembly, the machine absorbs energy from the shaft assembly. If it points away from the idling end, then the machine outputs energy.

The calibration coefficient to be taken into account in accordance with the invention is a more or less complex function of the torsion module of the materials from which the shaft assembly in the interior of the machine consists, of the geometrical characteristics of the shaft assembly and the angular velocity with which the shaft assembly rotates. An analytical determination of the calibration coefficient can lead to great difficulties in the case of a shaft assembly of complex construction and complex configuration such as can be the case, for example, in a turbine of constant-pressure design. However, the calibration coefficient can be empirically determined as a rule without difficulty in the course of a test run of the machine and the shaft assembly, preferably as a function of the operating parameters and for all operating states which are to be expected in regular operation. Later measurements of the torsion of the shaft assembly can then be carried out as relative measurements, and this is not at variance with their applicability for monitoring the acceptable functioning of the machine and of the shaft assembly.

In accordance with a further feature of the invention, the method comprises the steps of forming the shaft assembly with a first shaft mark on one side of the machine and with a second shaft mark on an opposite side of the machine, and wherein the measuring step comprises measuring the instant angular positions of the first and second shaft marks at a reference time, and determining the angle as a difference between the instant angular position of the first shaft mark and the instant angular position of the second shaft mark at the reference time. The measurement of the angular positions can be performed using simple means, for example a stroboscope set. This process feature requires only small costs and it is relatively simple.

In accordance with an additional feature of the invention, the determination of the power is repeated cyclically. This delivers an important statement for the judgment of whether the machine and the shaft assembly are functioning properly and acceptably. In accordance with a further feature, the torsion angle is determined by determining in an essentially continuous fashion a time derivative of the angle and integrating the time derivative. If, as mentioned, the angle is to be determined from the angular positions of shaft marks, it is likewise preferred for the determination of the time derivatives of the angular positions and the determination of the angle to be performed in an essentially continuous fashion by a combination of subtraction and integration over time of the time derivatives of the angular positions. It is a subordinate question whether differences between the time derivatives are formed first and the integration over time is then performed, or whether the time derivatives of the angular positions are first respectively integrated independently and the difference is subsequently formed from the integrals.

The determination of the time derivatives of the angular positions is, furthermore, preferably performed by measuring a rotation time, given by the rotation of the shaft assembly, of the corresponding shaft mark. Use is made in this case of the fact that the rotation time of a shaft mark changes when the shaft is twisted during the revolution of the shaft mark, with the result that this change is a measure of the temporal variation in the torsion of the shaft assembly, and is thus a measure for the time derivative of the angular position. It is easy to obtain angular information from the rotation time by multiplying by the angular velocity of the shaft assembly. If a measurement of this type is repeated cyclically, the result is a temporally regular sequence of rotation times on which the temporal variation in the angular position, which is determined by the torsion of the shaft assembly, is modulated.

It is preferred in principle and independently of the details of the determination of the angle to average the angle over a multiplicity of temporally successive determinations, and thus to create a certain compensation for measuring errors. This is important, in particular, when the method is used to monitor the distribution of the (positive or negative) mechanical energy transfer in a machine set having a plurality of machines, since such monitoring is usually performed over relatively long time periods, and a relatively coarse subdivision of such a time period, particularly in cycles of a few seconds in length, suffices to ensure quasi-continuous monitoring.

With the above and other objects in view there is further provided, in accordance with the invention, a device for determining a power, comprising:

a plurality of stationary machines including a first machine;

a shaft assembly traversing the stationary machines along and rotating about a given axis, whereby mechanical energy is transferred between the first machine and the shaft assembly, and the energy flows in the shaft assembly along the given axis;

a first measuring device disposed on one side of the first machine and a second measuring device disposed on another side of the first machine opposite the first measuring device, the first and second measuring devices measuring a torsion angle by which the shaft assembly is twisted in the first machine; and a computing device communicating with the first measuring device and with the second measuring device for determining a power in the mechanical energy transfer between the first machine and the shaft assembly as a product of the torsion angle and a predetermined calibration coefficient.

In accordance with again another feature of the invention, the measuring devices include shaft marks, provided on the shaft assembly, and sensors provided in a fixed fashion next to the shaft assembly for scanning the shaft marks.

Various embodiments are possible for combinations of shaft marks and sensors. It is thereby only important that the shaft marks and sensors be set up such that a position on the shaft mark can be determined at any time using the sensor, or that the sensor output a signal when the respective shaft mark passes by during a rotation of the shaft. As an example for the first possibility, there may be provided an arrangement with a color marking as the shaft mark and a stroboscope with a camera as the sensor. As an example for the second possibility, there may be provided an arrangement with a sensor a magnet, which is mounted on the shaft assembly and which rotates therewith, and an induction coil. Alternatively, consideration may be given to an elevation on the shaft assembly as the shaft mark, and a proximity sensor as the sensor. It will be appreciated to the skilled in the art that the type of communication between a sensor and a computing device requires no detailed explanation at this point, because such specific detail is best left to the engineer in each individual case.

The computing device in the device is preferably set up such that during a rotation of the shaft assembly it can be used during idling, i.e. when no mechanical energy is exchanged, to determine zero positions of the shaft marks and that, subsequently, the angular positions are determined relative to the zero positions when the shaft assembly rotates and mechanical energy is transferred between itself and the machine. These relative determinations directly yield statements concerning torsion of the shaft assembly and thereby directly reflect the influence which the mechanical energy exchanged exercises on the state of the shaft assembly.

A preferred location for a measuring device is a bearing housing which is arranged next to the machine and in which the shaft assembly is supported in a bearing. This design is distinguished by a particularly low outlay of apparatus and it is thus particularly favorable.

Moreover, the computer is adapted to compare the power thus measured with a predetermined nominal setpoint value and to output a signal if the power deviates from the nominal value. It goes without saying that the prescribed nominal value can be one of a plurality of such values, with each of them corresponding to a specific operating state. It is particularly easy in this way to detect a deviation which can point to a malfunction of the machine.

In accordance with again another feature of the invention, the system is utilized in a machine set with a turbine, for example a gas turbine or a steam turbine, and/or with a generator.

Of particular importance is the adaptation of the device for a plurality of machines which are disposed one behind the other along the shaft assembly. Each machine thereby is provided an associated measuring device and it is possible to determine an associated torsion angle by which the shaft assembly is twisted in each machine. The computing device is thereby adapted to determine the power with which mechanical energy is exchanged for each machine and the respective part of the shaft assembly. Such a device makes important contributions to the operational monitoring of a set of a plurality of machines, since it is particularly suitable for monitoring how the supply and takeoff of mechanical power are distributed over the machine set. Unacceptable loads on individual machines can be detected in a relatively simple manner with the novel system, and the disadvantageous load state may be corrected immediately after suitable signals are output.

In accordance with a concomitant feature of the invention, a single measuring device is provided between each two machines, and the single device is utilized in determining the power flow in each of the two machines.

Other features which are considered as characteristic for the invention are set forth in the appended claims.

Although the invention is illustrated and described herein as embodied in method and device for determining a power, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE PREFERRED EMBODIMENTS

Figure 1:
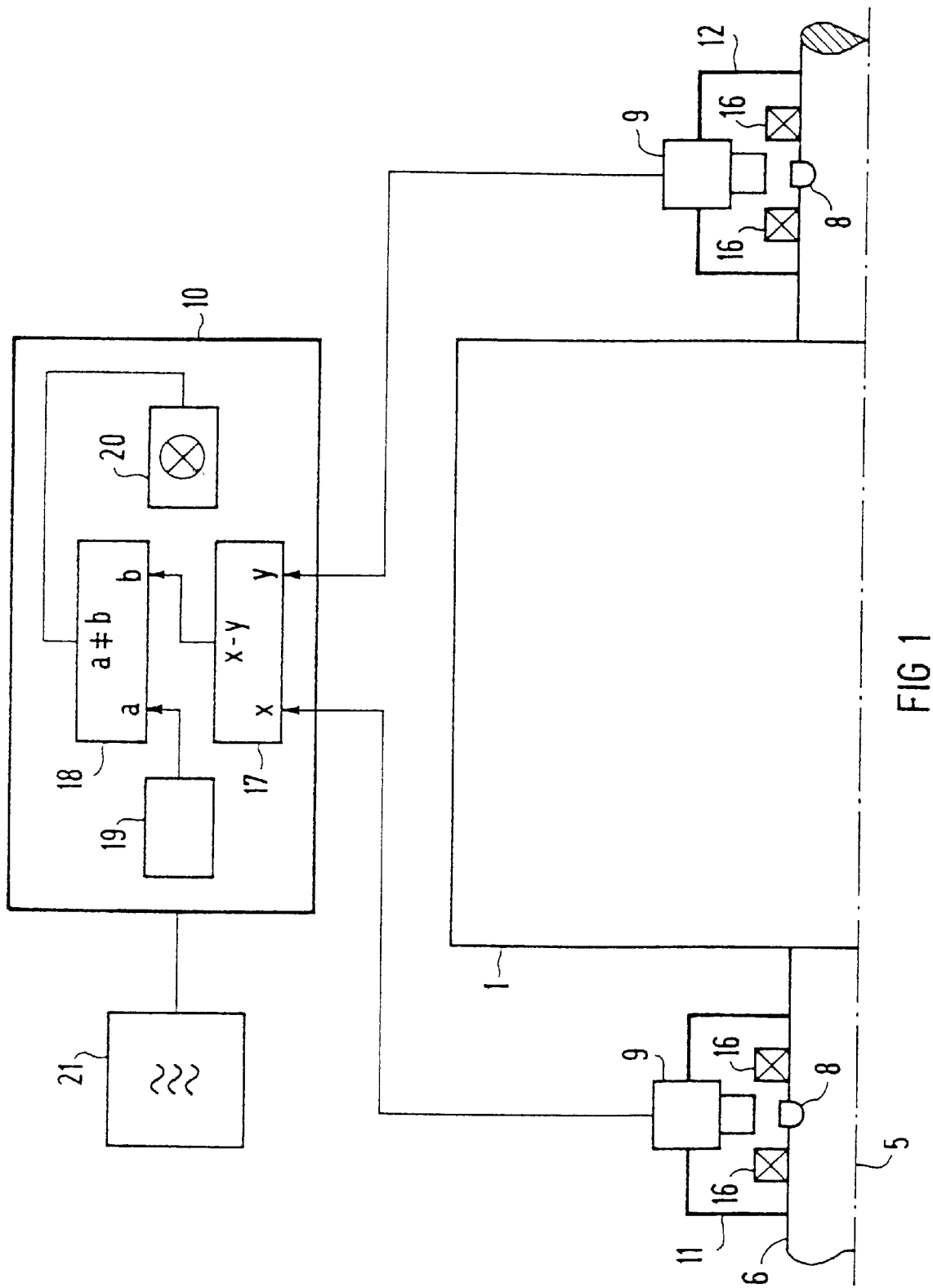
FIG. 1 is a diagrammatic illustration of a machine and a shaft assembly together with a device for determining the power with which energy is exchanged between the former.

Referring now to the figures of the drawing in detail and first, particularly, to FIG. 1 thereof, there is seen a machine 1, which is not to be specified in more detail at this juncture, which is traversed along an axis 5 by a shaft assembly 6. The machine 1 is stationary and the shaft assembly 6 rotates about the axis 5 at an angular velocity. Energy is exchanged between the machine 1 and the shaft assembly 6.

The shaft assembly 6 is supported in bearings 16 which are respectively disposed in pairs on the right and left next to the machine 1 and which are surrounded by an associated bearing housing 11 or 12.

In order to determine a power with which energy is exchanged between the machine 1 and the shaft assembly 6, two shaft marks 8 are provided on the shaft assembly 6. The shaft marks 8 are situated each within a respective bearing housing 11 or 12 and the shaft marks 8 enclose the machine 1 between themselves. Moreover, each bearing housing 11 or 12 carries one stationary sensor 9, which communicates with the corresponding shaft mark 8 and which can provide a specific statement on an angular position of the shaft mark 8 to a computing device 10.

If there is an exchange of energy between the machine 1 and the shaft assembly 6 in the interior of the machine 1, the shaft assembly 6 is twisted, and this leads to a mutual angular offset of the shaft marks 8, determined relative to a relative position of the shaft marks 8 when the shaft assembly 6 is at standstill or if the shaft assembly 6 is simply idling (no substantial energy transfer out of or into the shaft). This is expressed as a specific difference between the angular positions of the shaft marks 8 which are signaled by the sensors 9 to the computing device 10. The computing device 10. For simplicity, only the functional modules which are important in the present case are indicated in the computing device 10. There is determined the difference between the signaled angular positions in a subtractor 17 and the difference (x-y) is compared in a comparator 18 with a setpoint nominal value which is stored in a memory 19. The memory 19 may thereby contain either that setpoint alone or together with other nominal values corresponding to the possible operating states of the shaft assembly 6 and the machine 1. The result of the comparison is supplied to a signal generator 20 which outputs a signal when there is a deviation between the difference and the nominal value.

Additionally, the computing device 10 is provided with a clock generator 21, which can be used both to carry out cyclically repeated signals of angular positions and to measure rotation times of the shaft marks, which must alter if on the basis of varying operating conditions the torsion of the shaft assembly 6 alters between the shaft marks 8. Details regarding the configuration of the shaft marks 8, the sensors 9, the computing device 10 and the connections between these are of only subordinate importance in the present context. Numerous types come into question for shaft marks 8 and sensors 9, and it will be appreciated that the person of skill in the art will choose the proper such system in the proper context. The computing device 10 can, in particular, be an appropriately programmed computer. A large multiplicity of relevant teachings emerge from the prior art, and, again, the specific choice of hardware is left to the person of skill in the relevant art.

Figure 2:
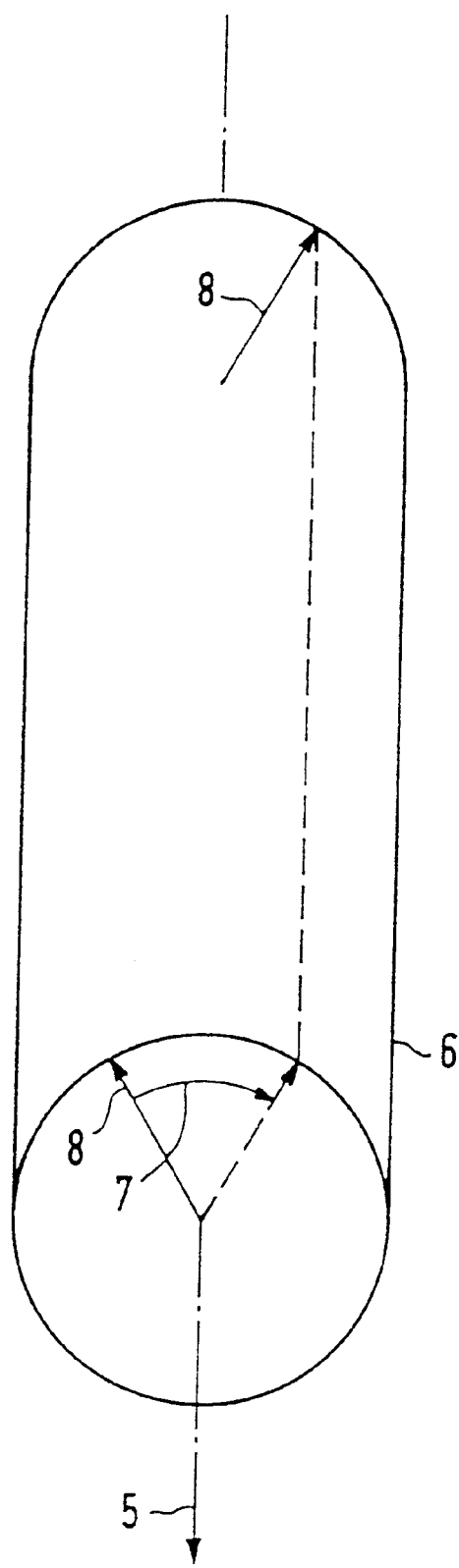
FIG. 2 is a perspective view of a part of a shaft assembly.

The term "torsion" in the context of this invention is best understood with reference to FIG. 2. There is shown a portion of a shaft assembly 6 from which it is to be assumed that it rotates counter-clockwise about the axis 5. It is to be further assumed that mechanical energy flows through the shaft assembly 6 along the direction given by the axis 5 (right-hand vector rule). Between the two ends of the illustrated piece of the shaft assembly 6, on which shaft marks 8 are entered as radial arrows, it is assumed that mechanical energy flows from the shaft assembly 6 into a machine 1, 2, 3, 4 (see FIG. 3). The result of this is that the shaft 6 rotates, which is expressed by the fact that the front shaft mark 8 is rotated to the left with respect to its rest position (illustrated by dashes). An angle 7 (the torsion angle) is enclosed between the rest position and the actual position. The angle 7 is thus a measure of the exchange of energy between the shaft assembly 6 and the machine 1, 2, 3, 4, in the present case for the outflow of mechanical energy from the shaft assembly 6. Specifically, the angle 7 is proportional to a torque which is exerted on the shaft assembly 6 and which, multiplied by the angular velocity at which the shaft assembly 6 rotates, yields the value of the power with which the energy is exchanged. The measurement of the angle 7 can be performed in principle using any conceivable method; because it can easily be realized, it is preferred for the angular positions of the two shaft marks 8 to be measured at an arbitrary, fixed reference point and for the angle 7 to be subsequently formed as the difference between these angular positions. It will again be appreciated that the person of skill in the pertinent art will choose the proper and preferred method of measuring the angle 7.

Figure 3:
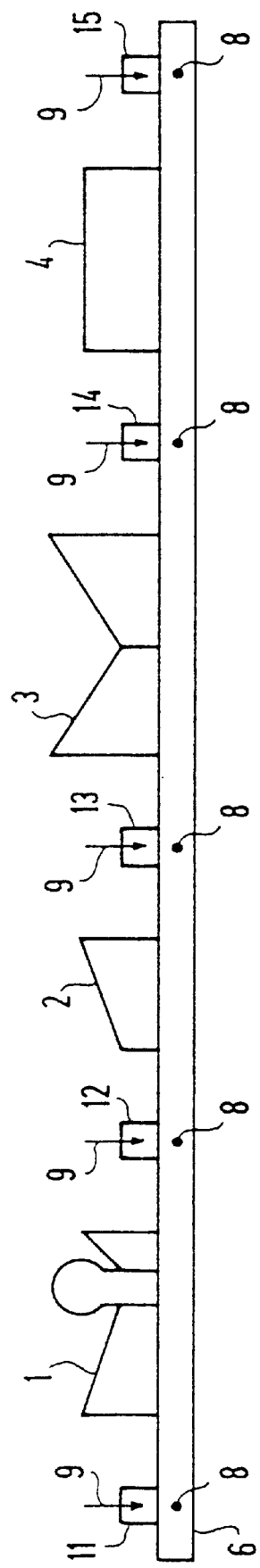
FIG. 3 is a schematic side view of a shaft assembly with a multiplicity of machines and a device which permits a statement regarding the energy exchanged between each machine and the shaft assembly.

Referring now to FIG. 3, there is shown a machine set with a gas turbine 1, a high-pressure steam turbine 2, a low-pressure steam turbine 3 and a generator 4, with all four machines 1, 2, 3, 4 arranged on a common shaft assembly 6. It is of little importance whether this shaft assembly 6 is a single continuous component or whether it comprises a plurality of mutually coupled components. A single bearing 12, 13, 14 is respectively located between two adjacent machine pairs 1–2, 2–3, and 3–4. Additionally, a bearing 11 or 15 is provided between each end of the shaft assembly 6 and the corresponding machine 1 or 4. Each bearing is provided with measuring devices 8, 9, in particular respectively with a shaft mark 8 and a sensor 9. It is possible using these five upgraded bearing housings 11 to 15 to determine for each machine 1, 2, 3, 4 the power exchanged between them and the shaft assembly 6, and thus to make a statement as to how the supply of mechanical energy to the shaft assembly 6 and the removal of mechanical energy from the shaft assembly 6 are distributed over the machine set 1, 2, 3, 4. It can be ensured in this way that each of the machines 1, 2, 3, 4 is operated in a manner which is proper and favorable for the specific machine. Any critical operating states which may occur can be reliably detected.

I claim:

1. A method for determining a power in a mechanical energy transfer between a first machine of at least two stationary machines and a shaft assembly traversing the at least two machines along a given axis and rotating about the given axis, whereby the energy flows in the shaft assembly along the given axis, the method which comprises:

measuring an angle by which the shaft assembly is twisted in the first machine, and determining a power transferred between the shaft assembly and the machine from a product of the angle with a predetermined calibration coefficient.

2. The method according to claim 1, which comprises forming the shaft assembly with a first shaft mark on one side of the machine and with a second shaft mark on an opposite side of the machine, and wherein the measuring step comprises measuring the instant angular positions of the first and second shaft marks at a reference time, and determining the angle as a difference between the instant angular position of the first shaft mark and the instant angular position of the second shaft mark at the reference time.

3. The method according to claim 2, which comprises cyclically repeating the measuring and determining steps.

4. The method according to claim 3, which comprises substantially continuously calculating a time derivative of the angle and determining the angle by integrating the time derivative.

5. The method according to claim 3, which comprises substantially continuously calculating time derivatives of angular positions of the first and second shaft marks, and determining the angle by a combined subtraction and integration over time of the time derivatives of the angular positions.

6. The method according to claim 5, wherein the step of calculating the time derivative of each angular position comprises measuring a rotation time, given by the rotation of the shaft assembly, of a corresponding shaft mark.

7. The method according to claim 3, which further comprises averaging the angle over a multiplicity of continuous measurements.

8. The method according to claim 1, wherein a plurality of machines are disposed along the shaft assembly, and the method comprises determining the power separately for each machine and the shaft assembly.

9. A device for determining a power, comprising:

a plurality of stationary machines including a first machine;

a shaft assembly traversing said stationary machines along and rotating about a given axis, whereby mechanical energy is transferred between said first machine and said shaft assembly, and the energy flows in the shaft assembly along the given axis;

a first measuring device disposed on one side of said first machine and a second measuring device disposed on another side of said first machine opposite said first measuring device, said first and second measuring devices measuring a torsion angle by which said shaft assembly is twisted in said first machine; and a computing device communicating with said first measuring device and with said second measuring device for determining a power in the mechanical energy transfer between said first machine and said shaft assembly as a product of the torsion angle and a predetermined calibration coefficient.

10. The device according to claim 9, wherein said first and second measuring devices each comprise a shaft mark on said shaft assembly and a sensor disposed stationary relative to said rotating shaft assembly for scanning said shaft marks.

11. The device according to claim 10, wherein said computing device is programmed to determine zero positions of said shaft marks when said shaft assembly rotates without an energy transfer taking place, and wherein said computing device is programmed to determine the angular positions relative to the respective zero positions when the shaft assembly rotates with an energy transfer taking place.

12. The device according to claim 10, which further comprises a plurality of bearing housings adjacent said machines each enclosing a respective one of said first and second measuring devices, and a plurality of bearings disposed in said bearing housings for supporting said shaft assembly.

13. The device according to claim 9, wherein said computing device is programmed to compare the power in the mechanical energy transfer with a predetermined nominal setpoint value, and to output a signal if the power in the mechanical energy transfer deviates from the setpoint value.

14. The device according to claim 9, wherein said first machine is a turbine.

15. The device according to claim 14, wherein said turbine is one of a gas turbine and a steam turbine.

16. The device according to claim 9, wherein said first machine is a generator.

17. The device according to claim 9, wherein said stationary machines are selected from the group of machines consisting of gas turbines, steam turbines, and generators.

18. The device according to claim 9, wherein said measuring devices are respectively disposed between each of said machines of said plurality of stationary machines along said shaft assembly, and said computing device is adapted to determine the power in the mechanical energy transfer between each said stationary machine and said shaft assembly.

19. The device according to claim 18, wherein a single measuring device is disposed between two respectively adjacent machines.

* * * * *